United States Patent Office 3,810,966
Patented May 14, 1974

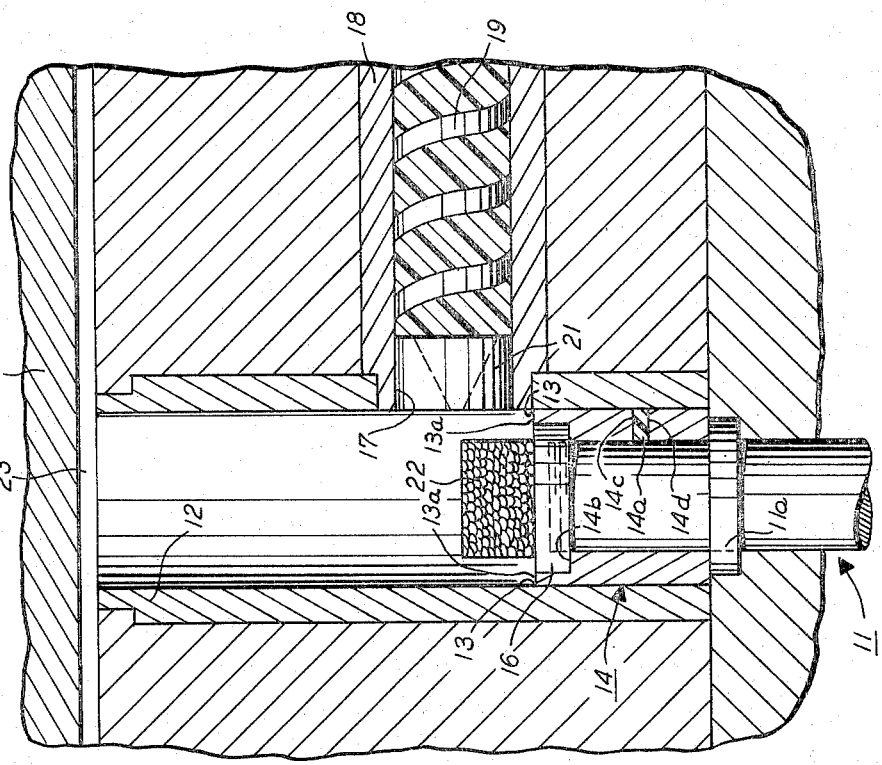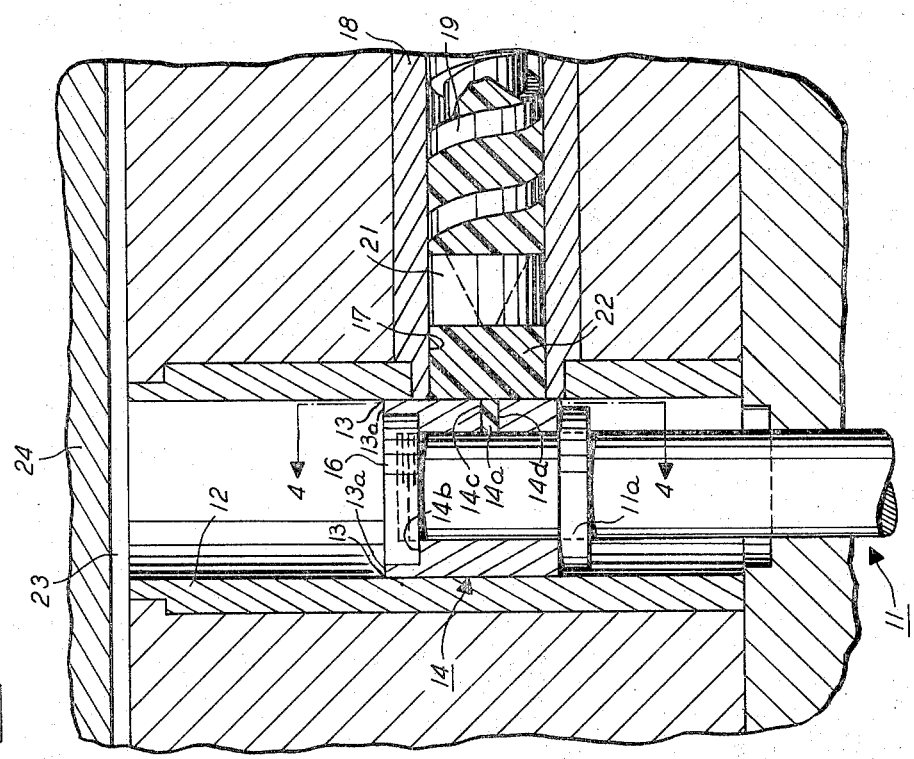

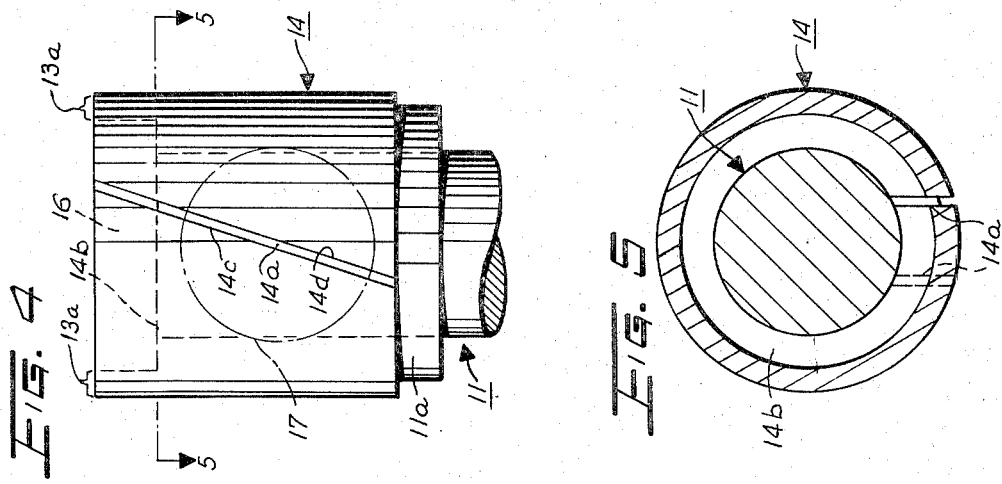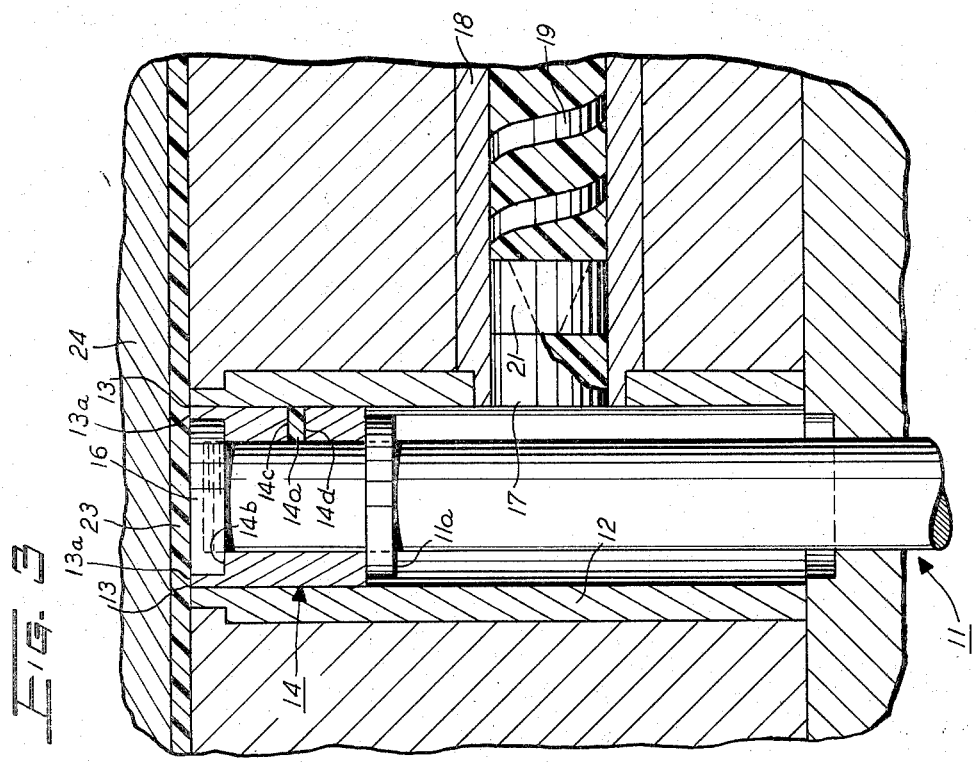

3,810,966
METHOD OF CONTINUOUSLY SEALING AN INTERFACE BETWEEN TWO RELATIVELY MOVABLE MEMBERS
Edward Paul Tober, Richardson, Tex., assignor to Western Electric Company, Incorporated, New York, N.Y.
Filed July 10, 1972, Ser. No. 270,555
Int. Cl. B29g 2/00
U.S. Cl. 264—262
10 Claims

ABSTRACT OF THE DISCLOSURE

The interface between two relatively movable members, such as a mold injection ram assembly and a cylinder in which the ram assembly is reciprocably mounted, is continuously sealed by forming a narrow, diagonal slot between the edges of a circular bushing and assembling the slotted bushing on the ram in the cylinder. On a first cycle of operation, molding material is forced into the slot to expand the bushing radially outward into tight-fitting sealing engagement with the cylinder. This may be accomplished as the assembled ram and bushing are being utilized to block the exit end of a material perform compacting chamber, or as the assembled ram and bushing are being advanced to inject a first material perform into a molding die. On subsequent cycles of operation, additional minute amounts of material are forced into the slot in the bushing to expand the bushing radially outward as the bushing wears and to maintain the bushing in tight-fitting sealing engagement in the cylinder.

BACKGROUND OF THE INVENTION

1. Field of the invention

This invention relates to a method of continuously sealing an interface between a first member and a second member with respect to which the first member is to be movable in tight-fitting sliding engagement, and more particularly to a method of continuously sealing an interface between a mold injection ram assembly and a cylinder in which the mold injection ram assembly is reciprocably mounted.

2. Description of the prior art

A prevalent problem in injection molding apparatus is the sealing of the space between a ram for injecting material into a molding die, and the cylinder or chimney in which the ram is reciprocably mounted. If this space is not sealed properly, the material flows past the ram and solidifies on the wall of the cylinder, and on subsequent strokes of the ram tends to "flake off" into the cylinder cavity. The resultant flakes eventually may be transferred to the molding die, causing blocked injection ports, "short shots" and other maintenance problems.

In the past, a standard manner of providing a seal for the mold injection ram and the cylinder has been by means of a circular bushing formed to close tolerances and mounted on the ram in close-fitting engagement with the cylinder inner wall. This arrangement, however, has not proven entirely satisfactory because of the difficulty in forming the cylinder inner wall and the periphery of the bushing to the required tolerances, and because as the bushing wears, a gap develops between the bushing and the cylinder. As a result, the apparatus must be taken out of service frequently for replacement of the bushing and/or the correction of other problems as noted above.

In other known apparatus in which an internally cooled mold injection ram is rotatable, as well as being reciprocable in a cylinder, sealing of the space between the ram and the cylinder is accomplished by utilizing some of the material being molded, as the sealing material. In this apparatus, the head of the internally cooled ram causes solidification of adjacent material to form a rigid seal in the cylinder just ahead of the ram. On each stroke of the ram, this solidified material is replenishde as necessary to maintain a tight seal in the cylinder. Any material which does leak by the head of the ram is captured in helical grooves provided in the head of the ram as the ram rotates, and is transferred by the grooves back to the mass of material in front of the ram. This apparatus, however, is unsuitable for molding applications which require an internally heated ram, and is disadvantageous because of the necessity of providing apparatus for rotating the ram, in addition to reciprocating the ram, in the cylinder.

SUMMARY OF THE INVENTION

In accordance with this invention, an interface between a first member and a second member with respect to which the first member is to be movable in tight-fitting sliding engagement, is continuously sealed by forming a narrow slot in the first member so that the member is capable of expansion. Material then is forced into the slot to exert an expansion force on the first member such that the first member attains a condition in which it is in tight-fiting sealing engagement with the second member. Subsequently, additional minute amounts of material are forced into the slot to expand the first member as the first member wears and to maintain it in tight-fitting sealing engagement with the second member.

In a specific embodiment of the invention, an interface between a mold injection ram assemby and a cylinder in which the ram assembly is reciprocably mounted, is continuously sealed by forming a narrow, diagonal slot in a circular bushing between opposite edges thereof, such that the bushing is capable of radial expansion. On a first cycle of operation, with the slotted bushing assembled on the mold injection ram in the cylinder, molding material is forced into the slot to expand the bushing radially outward into tight-fitting sealing engagement with the cylinder. This may be accomplished as the injection ram and the bushing are being utilized to block the exit end of a material preform compacting chamber, or as the injection ram is being advanced to inject a first material preform into a molding die. On subsequent cycles of operation, additional minute amounts of molding material are forced into the slot to expand the bushing further radially outward as the bushing wears and to maintain the bushing in tight-fitting sealing engagement in the cylinder.

BRIEF DESCRIPTION OF THE DRAWINGS

FIG. 1 is a cross-sectional, elevational view of a portion of an injection molding apparatus for use in practicing the method of the invention, in a first operating position;

FIG. 2 is a cross-sectional view similar to FIG. 1 showing the apparatus in a second operating position;

FIG. 3 is a cross-sectional view similar to FIG. 1 showing the apparatus in a third operating position;

FIG. 4 is a portion of the apparatus, modified in accordance with the invention, as viewed along the line 4—4 in FIG. 1; and FIG. 5 is a plan view of the modified portion of the apparatus shown in FIG. 4.

DETAILED DESCRIPTION

Referring to FIGS. 1, 2 and 3, the illustrated embodiment of the invention is shown applied to injection molding apparatus of a conventional type, which includes an internally heated mold injection ram 11 reciprocably mounted for movement in a cylinder or chimney 12. The purpose of the disclosed embodiment of the invention is to continuously seal an interface 13 between a circular bushing 14 and the cylinder 12, and thus a space 13a between the ram 11 and the cylinder, to prevent the flow of material past the ram and the bushing during an injection molding operation.

As is best shown in FIGS. 4 and 5, in accordance with this invention an elongated narrow slot 14a is formed in the circular bushing 14 and extends diagonally between peripheral edges of the bushing so that the bushing is capable of radial expansion and contraction. In addition, a circular nest 14b is formed in the bushing 14 so as to be capable of receiving a circular head 16 of the ram 11 in relatively close-fitting relationship (several thousandths of an inch), and so that a portion of the upper end of the slot 14a will be in direct communication with material in the cylinder 12 during an injection molding operation. Preferably, the bushing 14 is of a resilient, long-wearing metal, such as beryllium copper, and the slot 14a has a width on the order of .030 inch.

After the slot 14a and the nest 14b have been formed in the circular bushing 14, the bushing is assembled on the mold injection ram 11 by positioning the bushing over a reduced circular portion of the ram and in engagement with a shoulder defined by a circular flange 11a. The head 16 of the ram 11, which may be removably mounted on the ram by suitable screw threads, then is secured to the ram in the nest 14b of the bushing 14, to retain the bushing on the ram. The initial external diameter of the bushing 14 may be substantially equal to the internal diameter of the cylinder 12, slightly smaller (several thousandths of an inch) than the internal diameter of the cylinder, to facilitate its insertion into the cylinder, or slightly greater than the internal diameter of the cylinder, to help insure an initial tight fit in the cylinder.

After the bushing 14 has been assembled on the mold injection ram 11, the injecting molding apparatus can be operated in a normal manner so as to pass through a cycle of operation as illustrated in FIGS. 1, 2 and 3. Initially, referring to FIG. 1 the ram 11 is placed in an intermediate position in the cylinder 12, in which the bushing 14 blocks the exit end of a material preform compaction chamber 17 in a heated barrel 18, with the slot 14a in the bushing facing toward the compaction chamber. The disclosed apparatus includes a material feed source of the type in which a thermosetting molding material in pellet form is continuously introduced into the channel of a reciprocable and continuously rotating compacting screw 19 from a hopper, not shown. As the screw 19 rotates in place in a retracted position, as shown in FIG. 1, molding material is worked and advanced by the screw in the heated barrel 18 and through a reducing nozzle 21 on the forward end of the screw, into the compaction chamber 17. By the time the material is thus extruded into the compaction chamber 17, its temperature has been raised to approximately 25 to 30% below the melt temperature of the material.

In accordance with this invention, as the compacting screw 19 compresses the thermosetting material in the compaction chamber 17 to produce a material preform 22, a portion of the material is simultaneously forced into the narrow slot 14a in the bushing 14 to expand the bushing radially outward, as necessary, to move it into tight-fitting engagement with the cylinder 12. To achieve this result, the resiliency of the bushing 14 relative to the compacting pressure in the compaction chamber 17 should be such that the bushing will be expanded radially outward without the compacting pressure causing any flow of material between the bushing and the cylinder 12. In this regard, the tendency for material to be forced between the bushing 14 and the cylinder 12 before the bushing expands also can be controlled and substantially eliminated by limiting the gap between the bushing and the cylinder to a maximum value on the order of several thousandths of an inch. Similarly, as is apparent from FIGS. 1 and 4, the upper and lower ends of the slots 14a preferably are located above and below the upper limits of the exit end of the compaction chamber 17 a distance such that the bushing 14 can be radially expanded without the material flowing in the slot so as to be discharged out of its ends, or at least out of the upper end of the slot into the upper portion of the cylinder 12.

As the ram 11 then is retracted toward a lower-most position as shown in FIG. 2, an upper edge 14c (best shown in FIG. 4) of the diagonally extending slot 14a severs the material in the slot from the preform 22 in the compaction chamber 17. The screw 19 then is reciprocated in the barrel 18 to eject the compacted preform 22 from the compaction chamber 17 and into the cylinder 12 as shown in FIG. 2. By this time, the thermosetting material in the slot 14a will have solidified and hardened to a relatively rigid state. The hardening of the thermosetting material in the slot 14a, while the preform 22 is still capable of being injection molded, is attributed primarily to the fact that the material which is forced into the slot, because of its relatively small mass and the relatively high temperature of the bushing 14, rises to the melt or set temperature of the material at an accelerated rate as compared to the rise in temperature of the material in the preform.

The ram 11 next is advanced to its upper-most position as shown in FIG. 3, to inject the preform 22 into a runner system 23 in an associated molding die 24. During the injection operation, additional material may flow into the bushing slot 14a through its upper end to expand the bushing further radially outward, to help insure that the bushing 14 is in tight-fitting engagement with the inner wall of the cylinder 12 and that the interface 13 between the bushing and the cylinder is sealed so that material cannot flow past the bushing.

The ram 11 now is retracted to its intermediate position as shown in FIG. 1 and the above cycle of operation can be repeated. As the ram 11 is retracted, the material in the runner system 23 separates from the material in the bushing slot 14A adjacent the upper end of the slot and subsequently is ejected from the apparatus in a well known manner. On subsequent cycles of operation, since the tensile strength of the bond between the thermosetting molding material and the sides of the bushing slot 14a is inherently weak, as the bushing 14 wears the molding material and one or the other of the slot walls separate and additional minute amounts of material are forced into the slot 14a in the bushing by the compacting screw 19, or as the ram 11 advances, to expand the bushing further radially outward so as to maintain it in tight-fitting sealing engagement in the cylinder 12.

As an alternative to filling the slot 14a in the bushing 14 with material by the compacting screw 19, as shown in FIG. 1, the initial filling of the slot may be accomplished as the injection ram 11 advances the first preform 22 to inject it into the runner system 23. When the mold injection apparatus is utilized as illustrated in FIGS. 1, 2 and 3, this requires that the slot 14a in the bushing 14 be located so that it will not be in communication with the compaction chamber 17 when the apparatus is in the position shown in FIG. 1. However, in instances where the mold injection apparatus may be operated so that the injection ram 11 reciprocates only between its retracted and advanced positions as shown in FIGS. 2 and 3, with the forming of a preform comparable to the preform 22 being accomplished by moving the compacting screw 19 to a further retracted position and feeding only a metered amount of material into the barrel 18, the location of the slot 14a relative to the compaction chamber 17 is not important. In either case, as the ram 11 is initially advanced, material flows into the upper open end of the slot 14a and down the slot to cause the necessary radial expansion of the bushing to bring it into tight-fitting engagement in the cylinder 12. In this regard, as a result of the diagonal construction of the slot 14a, the material impinges upon and flows along an inclined surface 14d defined by the slot, thereby exerting a greater circumferential expansion force on the bushing 14 than if the surface extended parallel to the bushing's direction of movement. Then, as the bushing 14 wears on subsequent cycles of operation, additional minute amounts of material are forced into the slot 14a as the ram 11 advances, to expand the bushing further radially outward to seal the interface 13 between the bushing and the cylinder 12, as noted above.

When the slot 14a in the bushing 14 has been filled with material on the first cycle of operation, as shown in FIG. 1, since the periphery of the bushing is in tight-fitting sealing engagement with the cylinder 12, there is substantially no tendency for the bushing to rotate out of position on the injection ram 11. Thus, on each cycle of operation additional material will be forced into the slot by the compacting screw 19, to compensate for wear of the bushing, as necessary. However, it has been found that even if the bushing 14 should rotate after the first cycle of operation, the bushing will continue to function as an effective seal. This is attributed to the fact that the additional material required in the slot 14a in order to keep the bushing in proper sealing engagement with the cylinder 12 is forced into the slot during the advancement of the injection ram 11, as above described.

SUMMARY

Summarizing, a method of continuously sealing an interface, such as the interface 13 between the bushing 14 and the cylinder 12, has been disclosed in which the forming of the bushing and the cylinder to initial relatively close tolerances is not necessary. In this regard, where the bushing 14 is initially larger than the cylinder 12, the slot 14a in the bushing permits it to be contracted radially inward to fit into the cylinder. Further, where the bushing 14 is initially smaller than the cylinder 12, the slot 14a in the bushing fills with material on the first cycle of operation so that the bushing is expanded into tight-fitting sealing engagement with the cylinder. The expansion occurs whether the slot 14a in the bushing 14 initially is filled with material by the compacting screw 19 or on the first stroke of the injection ram 11 as it moves the first preform 22 into the runner system 23. Further, on subsequent cycles of operation additional minute quantities of material are forced into the slot 14a as the bushing 14 wears, either by the compacting screw 19 or as the injection ram 11 advances, so as to continuously maintain the bushing in tight-fitting sealing engagement with the cylinder 12 and permit the feeding of material into the cylinder for processing from a feed source on a continuous basis. This expansion of the bushing 14 to maintain an effective seal will continue until such time as the bushing is worn so that it no longer is capable of being radially expanded in the proper manner, thus reducing down time of the injection molding apparatus for maintenance purposes.

What is claimed is:

1. The method of continuously sealing an interface between a first member and a second member with respect to which the first member is to be movable in sliding engagement to process material from a feed source on a continuous basis and wherein the material will not readily bond to the first member, which comprises:
    forming a narrow slot in the first member such that the member is capable of expansion;
    forcing material from said feed source into the slot in the first member to exert an expansion force on the first member such that the first member attains a condition in which it is in tight-fitting sealing engagement with the second member; and
    forcing additional minute amounts of material from said feed source into the slot in the first member to expand the first member as the first member wears and to maintain the member in tight-fitting sealing engagement with the second member.

2. The method recited in claim 1, in which:
    the material initially is forced into the slot in the first member on a first cycle of operation and the additional minute amounts of material are forced into the slot on subsequent cycles of operation.

3. The method recited in claim 1, in which the first member is circular, and which further comprises:
    forming a slot in the first circular member so that the slot extends between opposite edges of the member and such that the member is capable of radial expansion; and
    forcing material into the slot in the circular member to expand the circular member radially outward into tight-fitting sealing engagement with the second member.

4. The method recited in claim 1, which further comprises:
    forming at least a portion of the slot in the first member so as to extend at an angle to the direction of movement of the first member relative to the second member.

5. The method recited in claim 1, which further comprises:
    forcing the material into the slot in the first member in a plastic flowable condition, and then permitting the material to solidify in the slot.

6. The method of continuously sealing the space between a first member and a second member in which the first member is movably mounted to process material from a feed source on a continuous basis, and wherein the material will not readily bond to a circular bushing on the first member, which comprises:
    forming a narrow slot in the circular bushing such that the slot extends between the edges of the bushing and such that the bushing is capable of radial expansion;
    assembling the slotted bushing on the first member in the second member;
    forcing material from said feed source into the slot in the circular bushing to exert a radially outward expansion force on the bushing such that the bushing attains a condition in which it is in tight-fitting engagement with the second member, to seal the space between the first member and the second member; and
    forcing additional minute amounts of material from said feed source into the slot in the bushing to expand the bushing radially outward as the bushing wears and to maintain the bushing in tight-fitting sealing engagement with the second member.

7. The method recited in claim 6, in which:
    the material initially is forced into the slot in the circular bushing on a first cycle of operation and the additional minute amounts of material are forced into the slot on subsequent cycles of operation.

8. The method of continuously sealing an interface between an injection ram assembly and a cylinder in which the injection ram assembly is reciprocably mounted to process molding material from a feed source on a continuous basis, and wherein the molding material will not readily bond to metal, which comprises:
    forming a narrow slot in a circular metal bushing such that the slot extends between the edges of the bushing and such that the bushing is capable of radial expansion;
    assembling the slotted bushing on the injection ram in the cylinder;
    forcing material from said feed source into the slot in the circular bushing on a first cycle of operation to exert a radially outward expansion force on the bushing such that the bushing attains a condition in which it is in tight-fitting sealing engagement with the cylinder;
    permitting the material in the slot in the bushing to solidify in the slot; and forcing additional minute amounts of material from said feed source into the slot on subsequent cycles of operation to expand the bushing radially outward as the bushing wears and to maintain the bushing in tight-fitting sealing engagement in the cylinder.

9. The method of claim 8, which further comprises:

blocking the exit end of a material preform compaction chamber with the assembled injection ram and bushing, with the slot in the bushing adjacent the exit end of the compaction chamber; and compressing material in the compaction chamber on a first cycle of operation and simultaneously forcing material into the slot in the bushing to cause radially outward expansion of the bushing which is necessary for the bushing to attain tight-fitting sealing engagement with the cylinder; and severing the material in the slot from the material in the compaction chamber.

10. The method of claim 8, which further comprises:

advancing the assembled injection ram and bushing in the cylinder to inject material into a molding die on a first cycle of operation and simultaneously forcing material into the slot in the bushing to cause radially outward expansion of the bushing which is necessary for the bushing to attain tight-fitting sealing engagement with the cylinder.

References Cited

UNITED STATES PATENTS 1,483,352   2/1924   Kiefer _____ 309—45

ROBERT F. WHITE, Primary Examiner

T. E. BALHOFF, Assistant Examiner

U.S. Cl. X.R

264—263